United States Patent
Teutsch

[11] Patent Number: 6,132,200
[45] Date of Patent: Oct. 17, 2000

[54] APPARATUS AND PROCESS FOR TEXTURING A THERMOPLASTIC EXTRUSION

[75] Inventor: Erich Otto Teutsch, Richmond, Mass.

[73] Assignee: General Electric Co., Schenectady, N.Y.

[21] Appl. No.: 09/143,048

[22] Filed: Aug. 28, 1998

[51] Int. Cl.[7] .............................. B29C 59/04; B29C 59/06
[52] U.S. Cl. .................... 425/325; 425/380; 425/385; 425/392; 264/293
[58] Field of Search ............... 425/71, 325, 326.1, 425/327, 380, 385, 392; 264/293

[56] References Cited

U.S. PATENT DOCUMENTS

| | | | |
|---|---|---|---|
| 3,795,471 | 3/1974 | Milani | 425/388 |
| 4,173,607 | 11/1979 | Bahr | 264/25 |
| 4,508,500 | 4/1985 | French | 425/392 |
| 4,511,323 | 4/1985 | Blaum | 425/385 |
| 4,671,913 | 6/1987 | Gen et al. | 264/171 |
| 5,164,227 | 11/1992 | Miekka et al. | 264/284 |
| 5,932,150 | 8/1999 | Lacey | 425/327 |

FOREIGN PATENT DOCUMENTS

| | | |
|---|---|---|
| 0 015 312 | 9/1980 | European Pat. Off. . |
| 2 043 164 | 2/1971 | France . |
| 11 91 550 | 3/1960 | Germany . |
| 25 32 085 | 1/1977 | Germany . |
| 2731834 | 1/1979 | Germany . |
| 57-207042 | 12/1982 | Japan . |
| 2 207 389 | 2/1989 | United Kingdom . |

*Primary Examiner*—Harold Pyon
*Assistant Examiner*—Thukhanh T. Nguyen

[57] ABSTRACT

In an apparatus for texturing an outer surface of an extruded thermoplastic resin article, a calibrator includes opposed and spaced apart sections for defining a gap which is determinative of a dimension for the article, an extruder feeds a formable extruded thermoplastic resin into the gap, and a mean is provided for feeding an elongated texturing material between at least one portion of the sections and the extruded thermoplastic material for imparting texturing to the extruded thermoplastic resin article.

12 Claims, 2 Drawing Sheets

APPARATUS AND PROCESS FOR TEXTURING A THERMOPLASTIC EXTRUSION

FIELD OF INVENTION

The present invention relates to an apparatus for texturing an extruded thermoplastic material.

BACKGROUND OF THE INVENTION

Texturing the surface of plastic extrusions is often difficult and may interfere with the extrusion process. Typically, texturing is performed as a separate process step after the extrusion step.

U.S. Pat. No. 4,671,913 to Gen et al. describes feeding an extruded sheet through cold press rolls followed by guide rolls, and then through embossing rolls.

U.S. pat. No. 5,164,227 to Miekka describes a method for decoration of a paper or plastic sheeting where the coated sheet is heated to soften the coating and then decorated using embossing rollers to decorate the sheet. A remote heat source softens the sheet before embossing. As set forth, the surface of the embossing roller is hard and distortion resistant.

For many extrusions, especially hollow extrusions, the use of textured wheels tends to deform the surface and distort the profile itself. Desirably, the profile requires support from the underside to resist the force of the wheels. Typically, the texturing wheel also has to provide sufficient cooling to the plastic surface so that the pattern is not diminished by subsequent operations such as calibrating. Another disadvantage of a texturing wheel or roller is an undesirable short repeat pattern which tends to be aesthetically objectionable. The use of a roller requires that the surface speeds of the roller match the surface speed of the extrudate so as to further complicate the mechanism.

Hence, it desirable to provide for an improved apparatus and process for texturing a continuous extrusion with an extended or random pattern without applying undue pressure to the surface of the extrusion.

SUMMARY OF THE INVENTION

The apparatus of the present invention may advantageously be used for extended surface texturing over a large area. Since relatively low pressure is exerted, extruded hollow lineal type structures may be desirably surface to textured. As a result, the apparatus is desirable for continuously applying surface texturing to a lineal type extrusion without distorting the extruded article.

In accordance with the present invention, there is provided an apparatus for texturing an outer surface of an extruded thermoplastic resin article comprising a calibrator having opposed and spaced apart sections for defining a gap therebetween, said gap being determinative of a dimension of said article, an extruder for feeding a formable extruded thermoplastic resin into said gap, and means for feeding an elongated texturing material between at least one of said sections and said extruded thermoplastic material for imparting texturing to said extruded thermoplastic resin article.

Also, in accordance with the present invention, there is provided an embodiment wherein the textured material comprises a strand.

DESCRIPTION OF THE PREFERRED EMBODIMENT

Figure 1:
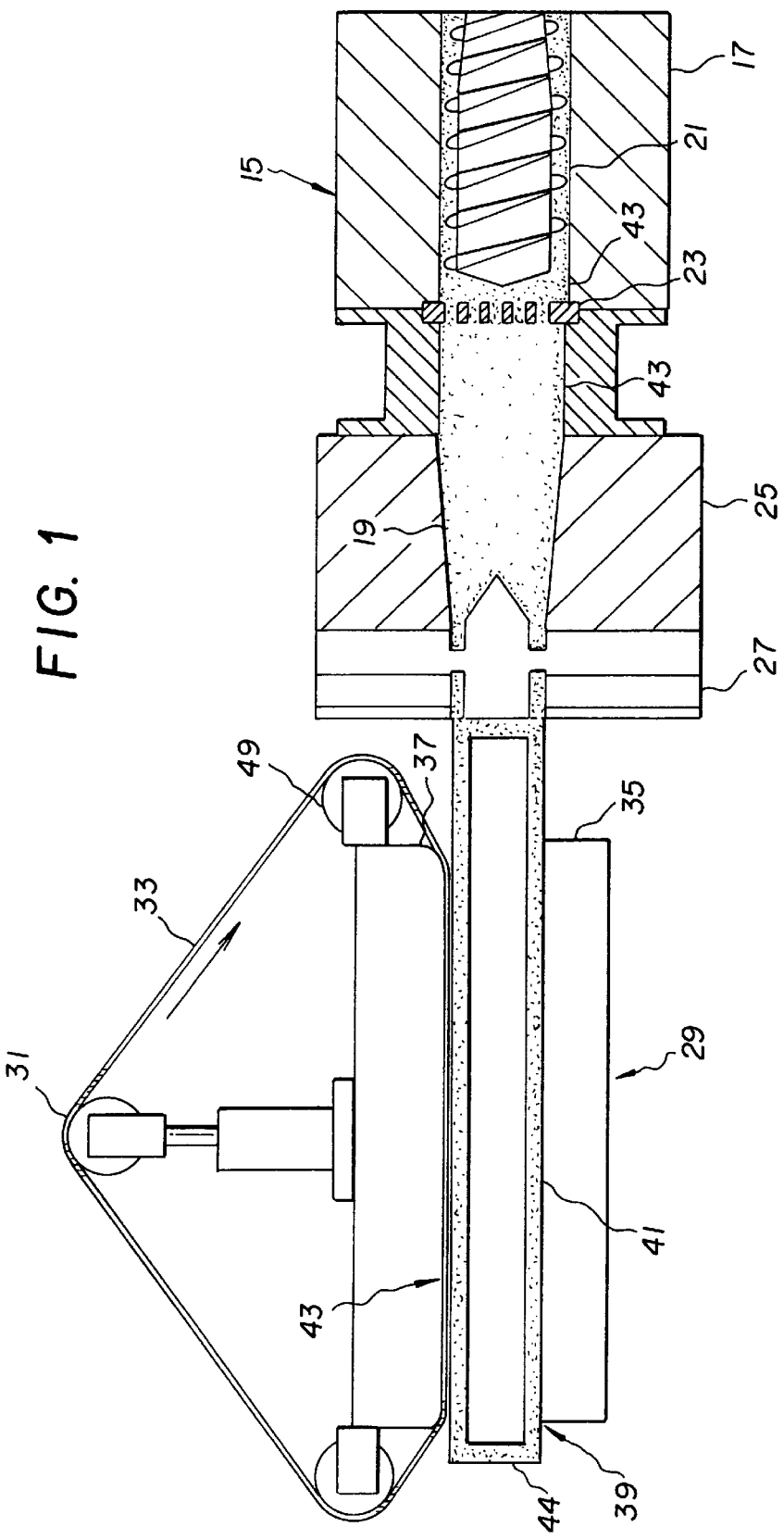
FIG. 1 is a schematic of the apparatus of the present invention showing an extruder and calibrator and carrier for the textured material.

FIG. 1 shows an extrusion molding machine or extruder at 15. The extruder 15 has a housing 17 with a central barrel shape opening 19 with a helical screw 21 mounted for rotation about an axis. At one end of the opening, a hopper (not shown) is utilized for feeding material to be extruded into the rear portion of the screw 21. Helical threads mounted on the screw 21 are positioned for moving material from the rear portion of the screw to a forward portion through the opening 19. As the material or feedstock is conveyed along the screw 21, it is heated by frictional forces caused by rotation of the screw 21. It is also contemplated that an external heating source such as an electrical resistant heater may be provided to heat the extruder 15 which in turn heats the feedstock. The housing 17 or the screw 21 are parts of the extruder which may heated.

At the forward end of the housing 17 and spaced from the forward end of the screw 21, a gate or breaker plate 23 is mounted transverse to the flow of feedstock. The gate 23, which includes a plurality of openings 43 for the passage of feedstock, acts to create a back pressure which contributes to the mixing and heating of the feedstock and also serves to filter impurities from the feedstock.

A die body 25 is mounted on the forward end of the housing 17. The mounting is conventionally made by bolting or clamping a flange on the die 25 body 25 to a flange on the housing 17. As illustrated in FIG. 1, the die body 25 includes a tapered central and axially aligned opening which throttles the feedstock. At the a die outlet a die plate 27 has an opening with the desired cross sectional shape of the lineal profile to be extruded.

It is also contemplated one or more layers may be coextruded or added at the end of the die 27. In coextrusion, additional extrudes may be provided for the additional layers. Another technique for adding a layer at the end of the die 27 is to include a capping plate which has an opening for the passage of capping layer. In this case, the outer layer may be of a weatherable material so as to resist the effects of UV radiation and moisture. Typically pressures within the extruder is in excess of 2,000 lbs/sq. inch, and is preferably from 2,000 to 5,000 lbs/sq. inch.

In accordance with the present invention, a calibrator 29 with a carrier 31 for feeding textured material 33 into the calibrator 29 is provided directly in the path of the melted thermoplastic material exiting the extruder 15 so that melted flowing material is fed directly into the calibrator 29 and in contact with the textured material 33 prior to complete cooling. The calibrator 29 includes opposed and spaced apart sections 35, 37 for defining a gap 39 therebetween. The gap 39 is determinative of a dimension of the final article. Each of the opposing sections 35, 37 include respective conformal surfaces 41, 43. The conformal surfaces 41, 43 preferably include perforations which communicate with a region of low air pressure so that the extruded material is pulled into contact with the a with the textured material 33. The flow of air under reduced air pressure through and around the textured material acts to cool the extrudate.

It is contemplated that the calibrator 29 may have an opening in the upper section 35 for example for the exit of the textured material 33. In this case, the textured material 33 would not flow entirely through the calibrator 29 but might exit after a short distance. The calibrator 29 is provided for both cooling and calibrating the extrusion. It is contemplated that some textured materials, such as non-conductive type materials might interfere with the cooling function of the calibrator. Thus, it may be desirable to have the textured material proceed only part way through the calibrator only a sufficient distance to impart texturing. For the remaining distance through the calibrator 29, the profile would be subject to the full cooling effect of the calibrator.

It is also contemplated that the textured material 33 may be fed between the lower section 35 and the extruded article 44. In this case, the textured material may serve as added support for the extrudate.

A carrier or means 31 for feeding an elongated texturing material 33 between at least one of the sections 35, 37 and the extruded article 44 imparts texturing to the outer surfaces of the extruded article 44. As illustrated in FIG. 1, a the carrier 31 is in the form of endless belt 47 which extends around rollers 49. The length of the repetitive pattern may be increased by increasing the length of the belt 47. It is also contemplated that the a non-repeating pattern may be achieved by having the carrier 31 be in the form of a roller which feeds a supply of pre-wound of tape into the calibrator 29. It is contemplated that the tape may be in the form of a ribbon or plurality of ribbons or tapes. According to preferred embodiments, the carrier 31 is self feeding in that no additional drive wheels are needed to collect or move the texturing material 33 through the calibrator 29. Contact of the textured material 33 with the moving extrudate is sufficient to cause the texture material to move through the calibrator 29.

Figure 3:
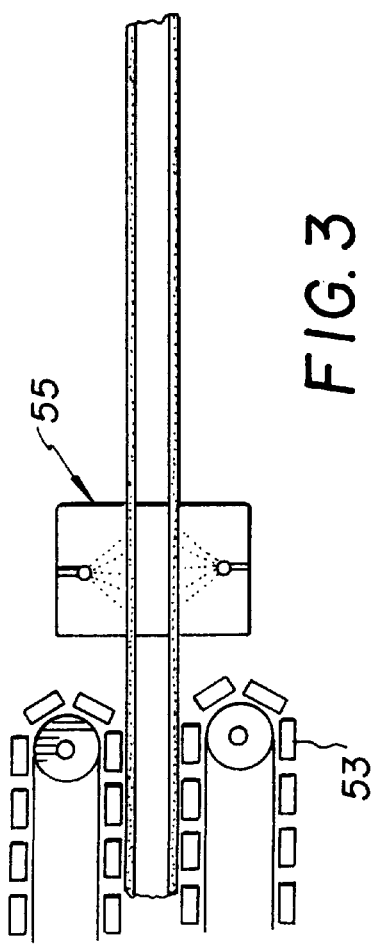
FIG. 3 illustrates the profile of a hollow extruded article.

Typically, the extrusion line, as illustrated in FIG. 3, includes a cooling section 55. The cooling section 55 may include a liquid spray for reducing the temperature of the extruded article 44. After the calibrator 29, and after the extruded article is solidified, a puller 53 in the form of opposing tractor type drives may be used to pull the extruded article 44 through the extrusion line. The lineal extrusion is drawn through a cutter mechanism that cuts the lineal extrusion into proper lengths. The force of the extrusion passing through the calibrator 29 tends to pull the texturing material 33 through the calibrator 29.

The texturing material 33 which may be in the form of a tape, web, belt, or woven or non-woven fiber is constructed of a flexible material that is stable under temperatures associated with extrusion. The material 33 includes raised surface portions in the form or projections and elongations which may be a random or ordered form. Random type projections are preferred for imparting a wood grain indent effect to the sheet or extrusion 44. It is desirable that the texturing material 33 be of porous type construction so that the extrusion 44 with the texturing material positioned between the extrusion 44 and a respective section 35 or 37 is drawn into contact with the calibrator 29.

The texturing material 33 includes raised surface portions in the form or projections and elongations which may be a random or ordered form. Random type projections are preferred for imparting a wood grain indent effect to the sheet or extrusion 44. The material 33 should be easily removed or substantially non-adherent to the surface of the extrusion. It is also contemplated that an additional roller (not shown) may be provided for transferring a colorant such as a dye to the surface of the texturing material to impart a variable coloration to the surface of the extrusion 44.

One preferred texturing material is a material that retains its integrity through repeated contact with the extruded resin without build-up of resin on the belt. A preferred materials for the for the texturing material comprises a fabric type material.

Fibers for such material include fibers of glass, graphite or carbon, metal materials, especially conductive metals drawn into wire, and polyamide polymers, with the most preferred being polyamide-6,6. Kevlar® polyamide fiber of Du Pont de Nemours is preferred for its extremely high tensile strength and great resistance to elongation.

A preferred material for construction of the belt is woven Kevlar® cord. Additionally, strands of resistant fiber, such as Kevlar® cord may be woven into the belt to give a random surface texture.

Another type of preferred texturing material is a crape type paper. The crape paper may be treated with an adhesive so that it is retained by the extrusion through the puller. The crape paper may be removed from the profile after installation so as to protect the surface against damage during lo shipping and installation.

Figure 4:
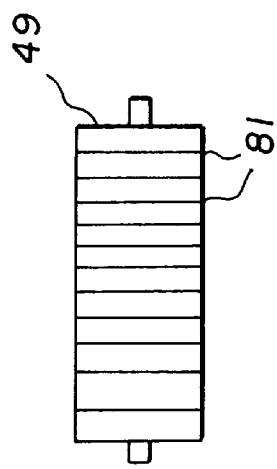
FIG. 4 illustrates one embodiment of the roller.
Figure 5:
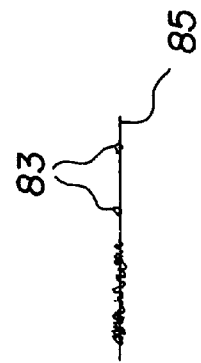
FIG. 5 illustrates a strand embodiment of the textured material.

Also, in accordance with the present invention, there is provided an embodiment where the textured material comprises at least one strand. A strand may in the form of fiber, thread, cord, filament, rope, fiber bundle. As illustrated in FIG. 4, the roller 49 may include a plurality of circumferential groves 81 to guide the strand 85 which is illustrated in FIG. 5. The strand 85 preferably includes raised surface portions 83 which are illustrated in FIG. 5 as knots. These projections may be a random or ordered form and can be utilized for imparting a wood grain indent effect to the extrusion 44. When a feed roller and a take up roller are utilized, it is contemplated that the grooves in the take up roller may be wider than the grooves in the feed roller so as to a permit lateral movement of the strand during take up. It is also contemplated that the carrier utilized may be a spool or other means for feeding the textured material into contact with the extrudate.

In more detail and in reference to FIG. 3 which is a continuation of the line shown in FIG. 1, the cooling section 55 includes a spray tank for cooling the extrusion. The additional cooling provided by the cooling section 55 removes additional heat from the extruded article. The puller is illustrated at 53 and includes a pair of opposing tractor type belt mechanisms which grip the extrusion to pull the extrusion. The puller 53 crates a stretching action as the melted article exits the extruder 17.

Figure 2:
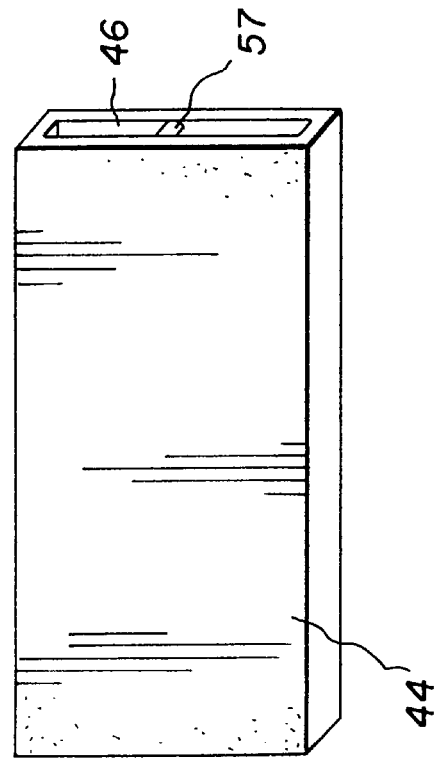
FIG. 2 illustrates the portion of the apparatus including the cooling section and the puller for the extruded material.

Reference number 44 refers to the extruded article which is shown as a hollow profile extruded article 44. The profile of the hollow extruded article 44 is illustrated in FIG. 2. Other cross sections for an extrusion are contemplated for such as T, U and C cross sectional shapes. Uses for such lineal extrusions include window and door frames, supports, and other framing material. The die plate 27 has a configuration permitting the formation of elongated hollow sections 46 as part of the extruded article 44.

The extruded articles may have a variety of cross sectional shapes depending on the use. FIG. 2 illustrates a cross section of lineal extruded structure having centrally extending wall portion 57 in the form of a perpendicularly extending flange. The lineal profile illustrated includes one wall portion intersecting to form a hollow cross sectional profile. It is contemplated that the cross-section can comprise curved sections. The lineal structure is desirably utilized as a frame for an opening in a building. Channel type structures may be utilized to hold stationary or moveable panels, as for example, a window pane or door. The calibrator 29 and the die body 25 are configured to prepare extrusions having various shapes.

The thermoplastic materials that can be employed in profile structure should be suitable for the geographical region in which the profile, when converted into a building product, would be used or depending upon the building code for the region. Typical thermoplastic materials are high temperature thermoplastics such as acrylonitrile-butadiene-styrene (ABS), polycarbonate, polycarbonate/ABS blend, a co-polycarbonate-polyester, acrylic-styrene-acrylonitrile (ASA), acrylonitrile-(ethylene-propylene diamine modified)-styrene (AES), polyalkylene terephthalate such as polybutylene terephthalate (PBT) or polyethylene terephthalate (PET) or blends thereof, blends of polyphenylene ether/polyamide (NORYL Registered TM from General Electric Company), blends of polycarbonate/polybutylene terephthalate and impact modifier (XENOY Registered TM resin from General Electric Company), blends of polycarbonate/PBT/PET, etc., or blends thereof with other additives such as fillers, impact modifiers, pigments, stabilizer, reinforcing agents, etc. It is contemplated that PVC can also be use.

Polyamides useful in the present invention are well-known in the art. Specific examples of polyamides are polyamide-6, polyamide-6,6, polyamide-11, polyamide-12, polyamide-6,3, polyamide-6,4, polyamide-6,10 and polyamide-6,12, as well as polyamides prepared from terephthalic acid and/or isophthalic acid and trimethylhexamethylenediamine; from adipic acid and m-xylylenediamines; from adipic acid, azelaic acid 2,2-bis-(p-aminocyclohexyl) propane, and from terephthalic acid and 4,4'-diaminodicyclohexylmethane.

Mixtures and/or copolymers of two or more of the foregoing discussed polymers or prepolymers thereof, respectively, are also within the scope of the present invention.

What is claimed is:

1. An apparatus for texturing an outer surface of an extruded thermoplastic resin comprising a calibrator having opposed and spaced apart sections for defining a gap there between, said gap being determinative of a dimension of said article, an extruder for feeding a formable extruded thermoplastic resin into said gap, and means for feeding an elongated texturing material between at least one of said sections and said extruded thermoplastic material for imparting texturing to said extruded thermoplastic resin article, said elongated texturing material is a strand or a ribbon and comprises raised portions facing said extruded thermoplastic resin for imparting indents to said extruded thermoplastic resin.

2. An apparatus for texturing an outer surface of an extruded thermoplastic resin article according to claim 1 wherein said extruder comprises a housing having an opening, a screw positioned in said opening, a die for forming said formable thermoplastic resin into a desired shape prior to feeding to said calibrator.

3. An apparatus for texturing an outer surface of an extruded thermoplastic resin article according to claim 1 wherein at least one of said calibrator sections comprises a container, said container having a plurality of perforations facing said texturing material, said container being connected to a source of reduced pressure for applying reduced pressure to said texturing material wherein said texturing material is a strand or a ribbon.

4. An apparatus for texturing an outer surface of an extruded thermoplastic resin article according to claim 3 wherein texturing material is porous and positioned intermediate said calibrator and said extruded resin whereby said extruded resin drawn toward said calibrator for texturing said extruded resin.

5. An apparatus for texturing an outer surface of an extruded thermoplastic resin article according to claim 1 wherein said elongated texturing material is a strand.

6. An apparatus for texturing an outer surface of an extruded thermoplastic resin according to claim 1 wherein said elongated texturing material is a strand or ribbon and comprise raised portions facing said extruded thermoplastic resin for imparting indents to said extruded thermoplastic resin.

7. A process for texturing an outer surface of an extruded thermoplastic resin article comprising extruding a thermoplastic resin from an extruder, feeding an extruded thermoplastic resin into a calibrator, said calibrator having opposed and spaced apart sections for defining a gap therebetween, said gap being determinative of a dimension of said article, and feeding an elongated texturing material between at least one portion of said sections and said extruded thermoplastic material for imparting texturing to said extruded thermoplastic resin article, said elongated texturing material is a strand or a ribbon and comprises raised portions facing said extruded thermoplastic resin for imparting indents to said extruded thermoplastic resin.

8. A process for texturing an outer surface of an extruded thermoplastic resin article according to claim 7 wherein said extruder comprises a housing having an opening, a screw positioned in said opening, a die for forming said formable thermoplastic resin into a desired shape prior to feeding to said calibrator.

9. A process for texturing an outer surface of an extruded thermoplastic resin article according to claim 7 wherein said feeding of an elongated texturing material is by an endless belt or bar roller having texturing material pre-wound thereon wherein said texturing material is a strand or a ribbon.

10. A process for texturing an outer surface of an extruded thermoplastic resin article according to claim 9 wherein said extrusion is biased toward said calibrator by an area of reduced air pressure.

11. A process for texturing an outer surface of an extruded thermoplastic resin article according to claim 10 wherein said area of reduced pressure comprises having a plurality of perforations facing said texturing material, said container being connected to a source of reduced pressure for applying reduced pressure to said texturing material wherein said texturing material is a strand or a ribbon.

12. A process for texturing an outer surface of an extruded thermoplastic resin article according to claim 11 wherein said strand or ribbon has raised portions facing said extruded thermoplastic resin for imparting indents to said extruded thermoplastic resin.

* * * * *